3,199,212
FLUIDIZED PARTICLE HEAT EXCHANGE
Claude Desire Foure, Courbevoie, France, assignor to
  Société Nationale d'Etude et de Construction de
  Moteurs d'Aviation, Paris, France
Filed Mar. 12, 1960, Ser. No. 16,049
Claims priority, application France, Mar. 21, 1959,
790,057
3 Claims. (Cl. 34—10)

The chemical industry generally employs the fluidised bed technique in which a certain quantity of a pulverulent material is introduced into a fluid passing through a container; the rate of flow of the fluid is such that the particles of the material, under the opposing influences of their weight and their entrainment by the flow of fluid, are put into suspension.

Depending upon the speed of the mass of particles relative to the walls of the container, a fluidised bed of particles is obtained, which is fixed, mobile or pulsating. Various effects can be obtained such as, for example, chemical reaction between one of the constituents of the fluid and the particles of the solid in suspension, reaction between certain of these constituents due to catalytic action of the solid in suspension; or improvement of the thermal exchange between the walls of the container and the flow of fluid. In all these cases, since the particles are generally uniformly distributed over the cross-section of the container, the quantity of particles involved is considerable.

This contingency represents an important disadvantage in the fluidised bed technique when the effect desired is improvement of the thermal exchange between the walls of the container and the fluid stream which passes therethrough.

Improvement of thermal exchange by establishing a fluidised bed of particles is attributed to:

(1) The destruction by the particles of limiting layers, both laminar and turbulent in zones where the speed of the fluid relative to the wall is low. Their destruction has the effect of increasing the speed of the fluid along the wall and consequently of increasing the coefficient of thermal exchange. Improvement of the thermal exchange is therefore due to the movement of the few particles situated along the walls of the container with the particles situated inside the body of the container having no part in improving the thermal exchange.

(2) The transverse conduction of heat by the particles. This conduction is partly associated with the thermal capacity of the particles; with the exchanges of heat between themselves or with the wall; and, particularly, their exchanges of heat with the fluid contacting them, which increases as their speed relative to the fluid is increased. During normal upward flow, this relative speed cannot exceed the limited speed required by equality of the weight and buoyancy for fluidization.

A further disadvantage of these methods of heat exchange employing the fluidised bed technique lies in the necessity of providing for a fixed bed a screen at the bottom of the bed of fluidised particles.

This screen is required to retain the particles, to regulate the speed of the fluid flow over the entire cross-section of the flow space and to permit the suspension of the particles.

The present invention has for an object improving methods of heat exchange in which a fluid, which may be hot or cold relative to a thermal exchange wall and which contains solid particles in suspension in a fixed or mobile fluidised bed, circulates in an exchange chamber in contact with the thermal exchange wall.

Apparatus, such as heat exchangers, provided with this improvement are also included within the scope of the present invention.

The present invention is characterised in that, at least in the vicinity of this wall, a relatively very large increase is obtained in the concentration of the fluidised particles in the fluid by imparting to these particles, in addition to their longitudinal movement relative to the wall of the exchange chamber with the fluid, a rotary movement or a plurality of interconnected rotary movements. A single rotary movement is used solely when the thermal exchange wall surrounds the space where the fluid circulates. The annular space or spaces defined by the particles in these movements are in contact in the direction of their inner surface. Fluid movements free of particles are in contact in the direction of their outer surfaces, either with the exchange wall alone, in the case of a single rotary movement, or with this wall and at least another annular space rich in particles in the case of a plurality of interconnected rotary movements.

The establishment of this novel rotary movement of the particles in the exchange chamber, in addition to their longitudinal movement, is obtained by imparting to the fluid in the exchange chamber, preferably before its contact with the thermal exchange wall, a rotary movement about the axis of the exchange chamber. This movement can be produced in the form of a helix the axis of which is that of the space in which the fluid circulates, the helix being produced by means acting in a direction substantially perpendicular to this axis.

All other suitable means can be employed for obtaining this movement.

It is very important that the rotary movement so created be given an adequate speed along the thermal exchange wall. The screen situated at the fluid inlet side of a fixed fluidized bed, is dispensed with for this purpose. The absence of the screen causes no inconvenience in creating the rotary movement.

Another advantage of the invention is that the fluid in contact with the thermal exchange walls has the greatest local velocity, whereas the velocity of the fluid occupying the central zone of the eddy or eddies is small (at a distance from the walls).

The establishment of a plurality of stable transverse rotary movements can be obtained by the means described in French patent, No. PV 790,055 filed on March 21, 1959.

In the accompanying drawings, in which like reference characters indicate like parts, illustrative embodiments of the present concept are shown for use hereinafter in describing the invention. These illustrative embodiments should not be construed as defining or limiting the invention.

In the drawings, FIG. 1 is a perspective schematic view, partially in section, of apparatus for imparting rotary movement to the fluid in adjoining volumes with the heat transfer surface arranged axially and internally of the apparatus.

Figure 1:
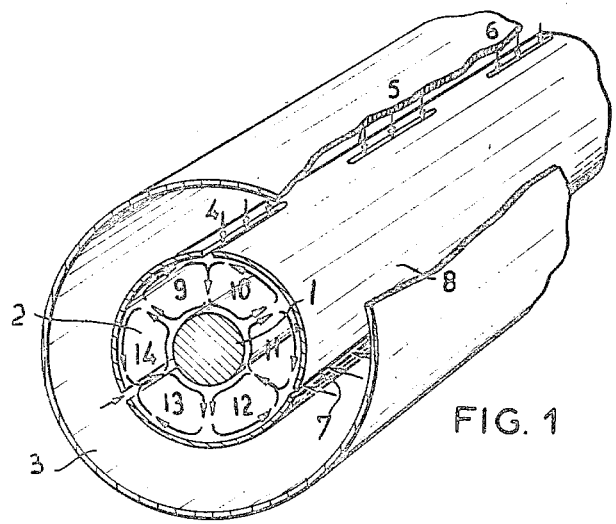
Figure 2:
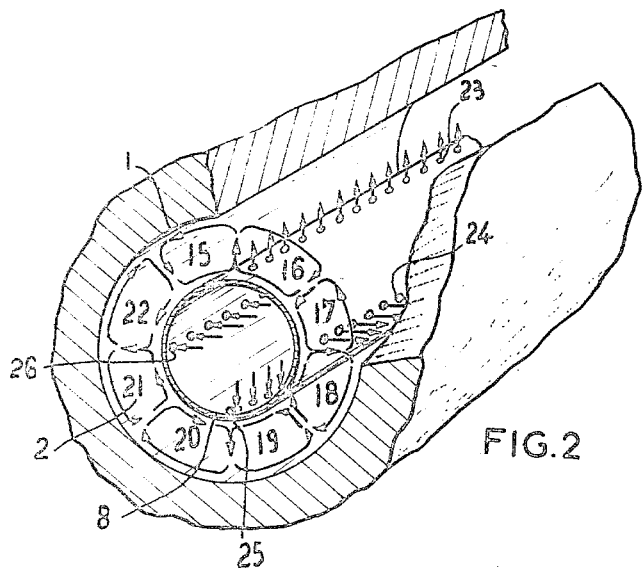
FIG. 2 is a view similar to that of FIG. 1 in which the heat exchange surface is exterior of the heat transfer zone.
Figure 4:
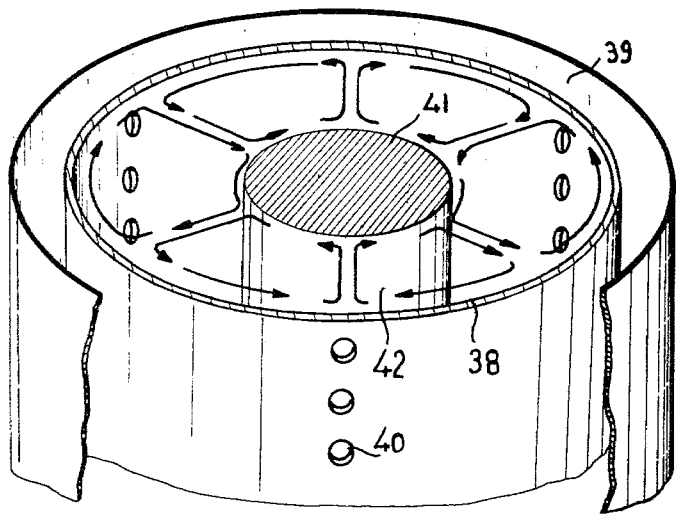
Figure 5:
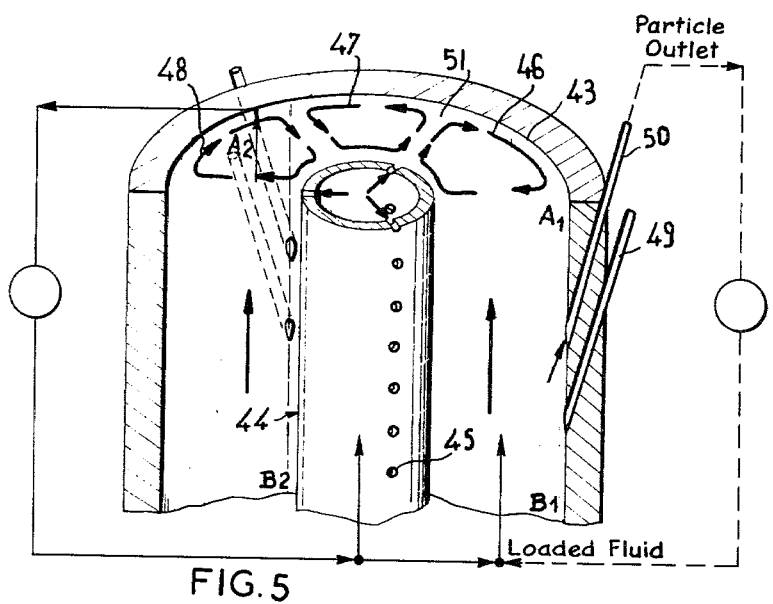

FIG. 4 is a view partly in section of apparatus corresponding generally to that of FIG. 1 where a plurality of rotary movements are imparted to the particle carrying fluid with the heat exchange surface arranged centrally and axially of the apparatus; and FIG. 5 is a view partly in section of apparatus generally corresponding to FIG. 2 in which a plurality of rotary movements are imparted to the particle carrying fluid, the exterior wall being the heat exchange wall.

FIG. 1 shows the thermal exchange wall 1, the exchange chamber 2 where the fluid circulates in contact with the thermal exchange wall 1 and the space 3 where the same fluid also circulates. Longitudinally aligned orifices such as 4, 5, 6 and 7 are provided in the wall 8 to deliver from the space 3 under high pressure relative to the space 2 jets of fluid which produce a plurality of associated rotary movements which correspond to the elementary chambers 9 to 14.

The exchange chamber 2 is supplied with fluid moving parallel to its axis so that the resultant movements inside the elementary chambers 9, 10, 11, 12, 13 and 14 are of a helicoidal shape.

In FIG. 2, the inlet space 3 for the jets of fluid is situated inside the exchange chamber 2. Orifices are arranged between the space 3 and the exchange chamber 2 in four rows 23, 24, 25 and 26 which delimit the elementary chambers 15 to 22. With this arrangement, the thermal exchange wall 1 surrounds the exchange chamber 2.

It should be recalled that one of the particular features of these movements is that each of the elementary chambers has at least one face comprising a wall, for example a thermal exchange wall, and at least one face common with an adjacent elementary chamber, along which face the two adjacent elementary flows have the same vectorial velocity.

According to the invention, the introduction of solid particles into the fluid produces, for each elementary chamber, an annular peripheral space which is rich in particles and in contact along its outer surface with the thermal exchange wall. As in the case of a single rotary movement, it is unnecessary to provide a screen between the particles and the fluid inlet, for the same reasons.

In general, the difficult problems usually posed by the risk of an agglomeration of the powder, by clogging or even by clots impermeable to the flow and rising, at least momentarily, to create awkward irregularities in the flow, are practically avoided, because the fluid flow naturally finds a regular passage in the inner region of the annular space containing the particles. In addition, any accumulation of powder break up in the course of their rotary movement along the wall.

A further advantage of the present improvement is that, for a given mean value of the longitudinal component of the speed of the fluid, the thermal exchange can be increased by increasing the relative speed of the particles in the annular space or spaces relative to the fluid. This is accomplished by increasing the transverse component of the speed of the fluid, which provides an increase in the transverse component of the relative velocity. It is evident that, when the longitudinal component of the speed of the fluid is at its limiting value as mentioned in the prior art, this relative speed can be further increased by increasing the transverse component.

Moreover, it should be noted that the longitudinal direction of the wall of the exchange chamber can be at any angle to the vertical (this is not the case when the fluid is not in rotation) but the flow of fluid must necessarily be upward.

In the case where the particles must remain in the exchange chamber in a fixed fluidised bed, the speed of the fluid at the wall can be increased (with respect to normal speeds) by increasing only the transverse component of this speed. This component does not force the particles to move towards the outlet of the chamber as does the longitudinal component of this speed.

The present invention particularly relates to heat exchange in nuclear reactors, the fluid carrying the particles then being the refrigerant fluid of the reactor. The particles may be a material acting as a moderator, for example glucine or graphite. The fluid carrying the particles can be in thermal exchange through a wall with another fluid acting as a heat carrier from the core of the reactor.

Figure 3:
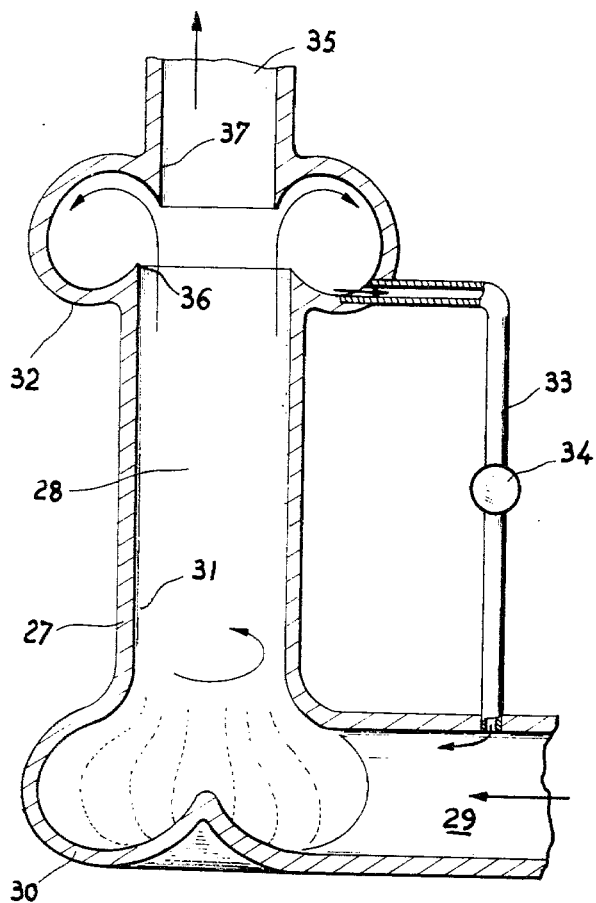
FIG. 3 is a cross sectional schematic elevational view of heat exchange apparatus in accordance with the present invention in which the flow of fluid carrying solid particles is within the heat exchange wall and the fluid is given a single rotary movement.

A preferred embodiment of the present invention is described below in conjunction with FIGS. 3 to 5 of the accompanying drawings in which:

FIGURE 3 shows an apparatus for the exchange of heat between the flow carrying the particles and the wall which surrounds it where a single rotary movement is imparted to the flow of particle carrier.

FIGURE 4 shows an apparatus for the exchange of heat between the flow of particle carrier and a wall inside this flow where a plurality of rotary movements are imparted to the flow of particle carrier.

FIGURE 5 shows a particle collector system where the particles are subjected to an ascending movement, a plurality of associated rotary movements being imparted to the flow of particle carrier.

FIGURE 3 shows a cylindrical and vertical exchange wall 27, to which a fluid is fed to the exchange chamber 28 by means of a horizontal channel 29. A gyratory movement is imparted to this fluid in the helix 30. The particles in suspension in the fluid are collected in the annular space 31 under the action of the centrifugal force. The particles collected in the annular space 31 move upwardly when the fluid charge exceeds a certain limiting value as shown in FIGURE 3. A secondary circuit consisting of the helix 32, the channel 33 and the recovery pump 34 collect all or part of the particles and recycle them to the downstream side of the feed channel 29. Escape of the particles through the discharge channel 35 from the mass of the fluid is avoided. The lower inner side 36 (at the upstream side of the general flow of fluid) of the helix 32 is recessed with respect to the upper inner side 37 (at the downstream side of the flow) in such a manner that virtually all particles passing the level of the side 36 are collected. The upper surface 37 may have a smaller diameter than the annular space 31, to collect only a part of the particles, in the auxiliary circuit, as desired.

FIGURE 4, in which the fluid flow is similar to that shown in FIGURE 2, has annular spaces 38 formed by the fluid-solid suspension having increased particle concentration. The different rotary movements are obtained by the action of the fluid supplied from the channel 39 through the orifices 40. The heat exchange surface is shown at 41.

Within the annular spaces 38, a space 42 is provided where the fluid circulates practically free of particles. The fluid flows along the face of the annular space 38 which is adjacent the exchange surface 41 provides for destruction of the limiting layers without requiring the particle concentration in the fluid to be greatly increased.

FIGURE 5 shows a thermal exchange wall 43 and a channel 44 distributing through orifices 45 jets of fluid providing a plurality of associated rotary movements as described with reference to FIGURE 2. In this embodiment the particles have an increasing velocity. Along the wall 43 in the longitudinal zones such as $A_1B_1$ and $A_2B_2$ common to adjacent annular spaces, the particles have little rotary movement. These particles are derived from the outer parts of the annular spaces 46, 47 and 48. Since the speeds of rotation of these particles are equal and opposite, their contact terminates their rotary movements. These particles, which are then principally subject to the ascending movement of the fluid, have a tendency to flow longitudinally along the wall 43 along lines $B_1A_1$ and $B_2A_2$. Conduits such as 49 and 50 disposed along these lines, in the upper part of the wall 43, draw off of these particles. The axis of these conduits are disposed at a relatively small angle with lines $B_1A_1$ and $B_2A_2$ for efficient recovery of the particles without disturbing the elementary rotary movements. In the zones such as 51 the particles have rotary movement which would result in only a very small quantity of particles being collected in orifices 49 and 50, should these orifices be located in zones 51.

This system permits collection and circulation within a special secondary circuit provided for this purpose, so that the particles in suspension are reintroduced into the mass of fluid, at the base of the exchange wall, which avoids the removal of particles with the fluid mass.

What I claim is:

1. In a process for heat exchange between a fluid flow in a given direction and a stationary heat exchange surface, the steps of introducing solid particles into the fluid flow, inducing in the fluid flow a plurality of elementary flows substantially parallel to the same direction, each of said elementary flows having a steady helical movement about an axis parallel to said direction, each of said rotating elementary flows sweeping a part of the heat exchange surface and being bordered by at least one adjacent elementary flow, adjacent elementary flows rotating in opposite directions.

2. In a process for heat exchange between a fluid flow in a given direction and a heat exchange surface, the steps of introducing solid particles into the fluid flow at the bottom of the heat exchange surface, inducing in the fluid flow-particle mixture a plurality of elementary flows substantially parallel to the same direction, each of the elementary flows having a steady helical movement about an axis parallel to the said direction, each elementary flow being bounded by and sweeping a part of the heat exchange surface and by at least one adjacent elementary flow, adjacent elementary flows rotating in opposite directions, and then collecting the solid particles from a part of the periphery of each of the elementary flows adjacent the top of the heat exchange surface.

3. Apparatus for heat exchange between a fluid flow and a heat exchange surface, comprising lateral wall means defining a volume and constituting said heat exchange surface, a conduit admitting the fluid at one end of said volume, a conduit for removal of the fluid at the other end of said volume, a cylindrical fluid supply conduit within and coaxial to said volume, three sets of openings in said supply conduit located in three axial planes angularly spaced at 120°, means for introducing solid particles into the fluid and collection openings for the particles in said lateral wall means adjacent said removal located in three axial planes angularly spaced at 60° from said first named planes, said openings connecting to conduits disposed obliquely with respect to said lateral wall means.

References Cited by the Examiner

UNITED STATES PATENTS

| 1,836,758 | 12/31 | Knapp. |
| 1,941,449 | 1/34 | Sylvan. |
| 2,039,692 | 5/36 | Van Tongeren. |
| 2,102,525 | 12/37 | Freeman _____ 233—27 X |
| 2,311,606 | 2/43 | Bannister _____ 233—45 X |
| 2,358,497 | 9/44 | Egloff. |
| 2,805,491 | 9/57 | Ludwig _____ 34—102 X |
| 2,911,730 | 11/59 | Schaub et al. _____ 34—10 X |

FOREIGN PATENTS

| 523,626 | 4/55 | Italy. |

NORMAN YUDKOFF, *Primary Examiner.*

CHARLES O'CONNELL, HERMAN BERMAN,
*Examiners.*

UNITED STATES PATENT OFFICE
CERTIFICATE OF CORRECTION

Patent No. 3,199,212                                            August 10, 1965

Claude Desire Foure

It is hereby certified that error appears in the above numbered patent requiring correction and that the said Letters Patent should read as corrected below.

Column 6, line 11, after "removal" insert -- conduit --.

Signed and sealed this 22nd day of March 1966.

(SEAL)
Attest:

ERNEST W. SWIDER                                                   EDWARD J. BRENNER
Attesting Officer                                                        Commissioner of Patents